3,223,764
PROCESS FOR PRODUCTION OF BIAXIALLY
ORIENTED POLYPROPYLENE FILM
Harry A. Kahn, Macedon, and Edward D. Henze, Pittsford, N.Y., assignors to National Distillers and Chemical Corporation, New York, N.Y., a corporation of Virginia
No Drawing. Filed Nov. 28, 1961, Ser. No. 155,446
10 Claims. (Cl. 264—178)

This invention relates to a new and improved process for the manufacture of biaxially oriented polypropylene. More particularly, the invention pertains to a process whereby polypropylene film and sheet is biaxially oriented to obtain an increase in strength and stiffness as well as to improve optical clarity and other properties.

Polypropylene film is of considerable commercial importance because of its clarity and outstanding gloss, stability in service and resistances to the passage of gases and moisture. Nevertheless, it would be advantageous to effect improvements in the properties of the polypropylene film to make it more suitable and economical as a packaging material. One method of achieving such results would be to orient or stretch the polypropylene film. The merits of stretching various thermoplastic films so as to orient their molecular structure has been well recognized by the prior art. Such oriented films show improvements in many properties over the unoriented films, and the attainment of these improved properties at low cost in commercial operations is obviously desirable.

The prior art discloses many procedures for improving certain properties of thermoplastic films by stretching or orienting the film in a longitudinal direction, i.e. the machine direction, and/or in a transverse direction. With polypropylene film biaxial orientation, both longitudinal and transverse orientation, is preferred; since it was found that film which has been stretched in only one direction, while showing improved properties in the direction of stretching, shows an undesirable decrease in such important properties as tensile strength, tear strength, impact resistance, and elongation in the unoriented direction. The loss in such properties, even in only one direction, may render the film considerably less attractive from a commercial standpoint. There is a need, therefore, in this field for an effective, low cost process for orienting the polypropylene film both in a longitudinal and a transverse direction to produce a biaxially oriented film product.

Although the prior art discloses orientation processes involving the use of tubular thermoplastic film and the simultaneous stretching in longitudinal and transverse direction of continuous traveling thermoplastic flat film or web, an important commercial process is to stretch a traveling thermoplastic web or film sequentially, first in one direction and then in the other, generally longitudinal or machine direction followed by transverse or lateral orientation. The application of the latter method to obtain biaxial orientation of the macromolecular chains, comprising crystalline polypropylene, in the plane of the film has encountered serious difficulties. It was found, for example, that the transverse stretching step impairs the orientation achieved during the longitudinal stretching step. This undesirable effect was further found to increase directly proportional to the amount of transverse stretching carried out in the second step. When in order to avoid impairment of the longitudnal orientation, transverse stretching is halted at the point where the properties of the polypropylene film in the longitudinal and transverse directions are approximately equivalent, the film product had an undesirable appearance resulting from localized stretchings and was not commercially acceptable. This is caused by the tendency of polypropylene to "neck" or line draw so that there is a minimum stretch ratio below which smooth film cannot be obtained. Moreover, when a high level of machine direction orientation is applied in order to counteract the deterioration of properties in the next stretching step the subsequent transverse stretching step also caused undesirable splitting in the polypropylene film.

The prior art has previously recognized some of the foregoing problems associated with known biaxial orientation processes and has, in general, attempted to resolve them by developing certain special treatments. One of the proposed methods involves compressing the film by rolling it in one or more stages and in one or more directions. It was subsequently found that such an operation is not only time consuming but also quite complex. Another proposal calls for the incorporation of certain plasticizing or swelling agents in the polymer resin before extrusion. This method has the disadvantage of modifying the properties of the film in such a manner that it cannot be employed for many packaging operations. In addition, this particular method requires a separate and a difficult plasticizer or swelling agent removal step.

One object of this invention is to provide a biaxial orientation process for polypropylene film which avoids the difficulties encountered in the prior art processes. Another object of this invention is to provide a process for biaxially orienting a traveling flat film or web of polypropylene first in a longitudinal direction and then in a transverse direction. One other object of this invention is to provide a biaxial orientation process which leads to the manufacture of an oriented polypropylene film product having outstanding physical and optical properties. A further object of this invention is the production of a biaxially oriented polypropylene film product having balanced properties both in the longitudinal and transverse directions and having controlled ratios of properties in the two directions. These and other objects of the invention will become apparent from the ensuing description and illustrative embodiments.

In accordance with the present invention it has been found that a sequential operation comprising the separate steps of longitudinal and transverse stretching can be effectively employed to produce a biaxially oriented polypropylene film provided a high degree of melt orientation is achieved during extrusion of the film and a carefully controlled quenching step is carried out immediately following extrusion. It will be understood, however, that there are other important features in the present orientation process, and these features will be discussed in detail in the following description. In general, the process comprises the following sequential steps to obtain the biaxially oriented polypropylene film product:

(1) Extrusion
(2) Quenching
(3) Drying
(4) Longitudinal Stretching
(5) Transverse Stretching
(6) Annealing
(7) Trimming
(8) Winding-up If desired, the surface of the biaxially oriented film may be treated following the annealing step to improve its adhesion characteristics. This type of treatment is well known in the art and may be accomplished by subjecting the film to a corona discharge or oxidizing flame treatment. This type of treatment renders the surface of the film more receptive to printing, adhesion and coating. After the film has been so treated, it may be coated with various compositions to improve properties such as heat-sealing, etc. In some instances it has been found helpful to trim the traveling flat film several times during the course of the above sequential process. Thus, for example, the film may be trimmed immediately following the drying and/or the longitudinal stretching steps as well as just prior to the wind-up operation. The annealing or heat setting step may be eliminated in certain runs in order to produce a special type of biaxially oriented polypropylene film product with high shrinkage.

In accordance with another important feature of the invention, it has been found that a second longitudinal stretching step may be employed following the transverse stretching step to obtain a substantially balanced biaxially oriented polypropylene film. This particular film product is characterized by having approximately the same degree of orientation in both the longitudinal and transverse directions and properties such as tensile modulus, tensile strength, elongation, impact strength and shrink energy, which are approximately the same in both directions, also birefringence is practically eliminated. Although a balanced biaxially oriented polypropylene film may be desirable for some commercial uses, the oriented film produced by the sequential longitudinal and transvere steps will be generally acceptable for most purposes. Nevertheless, it will be understood that the present invention does encompass an operation where the necessary orientation is accomplished by (1) melt orientation, (2) longitudinal stretching, (3) transverse stretching, and (4) a second longitudinal stretching.

The feed material, the sequential steps, and the operating conditions of the present invention are delineated below:

FEED MATERIAL

Commercially available polypropylene resin may be employed as feed material. In general, the polypropylene resin will have an ASTM melt index or flow rate of about 4 to 7 grams per 10 seconds at 230° C., an isotatic polypropylene content of greater than about 70% by weight, preferably between about 85 to 98% by weight, and an intrinsic viscosity of about 1.0 to 4.0, preferably about 2.0 to 2.5. Suitable polypropylene resins which meet these specifications are, for example, sold under the trademarks Profax, Escon, Tenite, etc.

Although the feed material may comprise a substantially virgin polypropylene resin, it has been determined that polypropylene scrap in significant amounts may be utilized to form the feed mixture. Thus, the feed mixture may contain from 0 to 80% by weight, and under usual conditions about 20 to 45% by weight, of polypropylene scrap material.

The polypropylene scrap used in formulating the scrap-containing feed mixtures may be obtained from the trimming operations employed in the process of this invention or from off grade oriented polypropylene film products as well as from any other source. The ability to use scrap in this process is another important feature with obvious economic advantages.

EXTRUSION STEP

The polypropylene feed material or mixture is extruded through conventional extrusion apparatus at temperatures ranging between about 350° to 550° F. The extrusion operation will be carried out so that the temperature at the die will be about 350° to 500° F. and the pressure in the die will be about 500 to 2000 pounds per square inch. The thickness of the web or sheet being extruded will range from about 40 to 60 mils, and preferably about 8 to 12 times the thickness of the cooled extruded web.

Immediately following extrusion the polypropylene web is subject to a minimum draw down ratio of at least about 7:1, and preferably about 10:1 to 12:1, to achieve maximum flow or melt orientation in the polypropylene web. It will be understood, however, that higher draw down ratios are preferred, and that the 12:1 ratio is not a critical upper limit. The draw down ratio is accomplished by pulling cooled web away at a higher linear speed than it issues from the die lips. This causes the molten web to stretch and thin rapidly, generating a high degree of shear and flow orientation. The web is quenched rapidly to preserve the flow orientation and prevent thermal movement from randomizing the molecular chains. The thickness of the web after draw down and quenching will generally be within the range of about 2 to 20 mils.

QUENCHING STEP

The extruded polypropylene web is quenched by passing the web into a water bath with the surface of the water or other quench liquid being maintained at a gap of about 1/16 of an inch to about 2.0 inches, preferably about 3/8 to 1 inch, from the die. Careful control over this gap is an essential feature of this invention. If a gap less than 1/16 of an inch is employed as excessively hazy polypropylene film product will result, while a gap of greater than about 2.0 inches fails to generate sufficient melt orientation during the extrusion step and results in a polypropylene film product which is unduly weak in the machine or longitudinal direction and is difficult to keep from breaking during winding and slitting operations, and which will split easily when wrapped on packages.

The attainment of melt orientation during extrusion and the use of the specific quenching step are essential features of this invention. If melt orientation is not obtained during extrusion or is lost during the quenching or cooling step, it will be difficult to successfully achieve a commercially acceptable oriented polypropylene film product. While the reasons for the effectiveness of melt orientation are not fully understood, it has been demonstrated that unless melt orientation is achieved a considerable amount of undesirable splitting occurs when the traveling flat film or web is subjected to the transverse stretching step. One explanation for this effect may be that orientation of solidified film by stretching produces greater stresses and causes rupture of the crystal structure along the direction of orientation. This would result in a general weakening of the polymer against forces at right angles to the stretch direction as occur in the subsequent step. Melt orientation aligns the molecular chains for reinforcement but still permits normal crystallization to take place during quenching.

In order to successfully carry out the quenching step it is also important to have the surface of the water as smooth as possible and substantially free of ripples. Any rippling or disturbance of the water surface will result in serious gauge variations in the polypropylene web which will in turn be intensified during the longitudinal and transverse stretching steps.

Although certain specific features of the invention have been described above with respect to the extrusion and water bath quench systems, it will be understood that other methods and apparatus are considered to be within the scope of the present process. It is possible, for example, to employ a dry casting system wherein the molten polymer is extruded directly onto a chill roll and pinned against the chill roll by effective air knife techniques or light pressure rolls. The crux of this step is to draw the melt down sharply over a short distance and cool it quickly before thermal disorientation can take place.

DRYING STEP

As the polypropylene web is drawn from the water by the use of conventional techniques, it is important to remove entrained water from the surface of the web. The water removal may be accomplished, for example, by passing the web through pinch rolls which squeeze off the water. It is also possible to remove the entrained water by means of rubber squeegies mounted so as to contact both sides of the web as it leaves the water bath or to blow the water off with jets or streams of air. It will be understood that the precise method of removing entrained water from the quench web is not an essential feature of the present invention, and that various other methods and apparatus may be effectively utilized.

The more important characteristics of typical polypropylene webs produced according to the preceding steps are as follows:

*Table I*

Tensile strength (p.s.i.):
    Machine direction _____ 8,000–12,000
    Transverse direction _____ 4,000–6,000
Tensile impact strength (ft. lbs./in.$^3$):
    (ASTM-D-18-22-61T):
    Machine direction _____ 140–320
    Transverse direction _____ 15–65
Birefringence _____ >0.001

LONGITUDINAL ORIENTATION

The extruded web, after removal of entrained water therefrom is subjected to a first stretching operation whereby additional machine direction or longitudinal orientation is achieved. It will be understood that this particular longitudinal orientation is in addition to the melt orientation achieved during the aforedescribed extrusion and quench operations. In general, the longitudinal orientation is carried out at temperature ranging from about 200° to 300° F., and generally about 230° to 270° F. The film is stretched from about 20 to 60%, preferably about 30%, or in a stretching ratio of about 1.2:1 to 1.6:1, in the machine direction by means of the longitudinal orienting system.

Various stretching equipment may be employed to carry out the longitudinal or machine direction orientation. An arrangement comprising a series of slow and fast rolls provided with temperature controls has been found to be particularly convenient, although it is not intended to limit the invention thereto. In general, this arrangement comprises a group of horizontally disposed, closely-spaced, parallel rolls, generally designated as "slow" rolls, followed by a group of horizontally disposed, closely-spaced, parallel rolls driven at a higher speed and designated as "fast" rolls. The slow rolls are maintained at an elevated temperature by circulating oil at temperature of about 200° to 350° F. therethrough. Other methods of heating these rolls and various internal heating medium may, of course, be employed. The fast rolls are generally equipped for water cooling and may be cooled or allowed to run neutral.

In order that a firm grip may be maintained on the polypropylene film being stretched, at least three rolls are employed in each group. It will be understood that numerous idler rolls may be employed in various relationships to the slow and fast rolls to control the film during longitudinal orientation and to obtain the desired degree of stretching without distorting the film. The use of idler rolls may also result in smoothing out the stretching operation in such a manner that a series of very small uniform stretches will occur with elimination of elongation variations which may occur in a fairly cyclic fashion. These variations may also be overcome by continuously adjusting the gap between the slow rolls and the fast rolls. Shorter gaps tend to shorten the stretching distance thereby promoting a more uniform longitudinal stretching.

The temperature of the polypropylene film during the longitudinal stretching will generally vary from about 220° to 300° F. at the point or points where actual stretching occurs. The rate at which the film is longitudinally stretched may vary over a wide range depending upon such factors as the specific resin employed, the particular apparatus utilized, the degree of longitudinal orientation to be achieved, the desired uniformity for the oriented polypropylene film product, the gauge, and the balance of physical and optical properties which are desired. In general, the film rate will range from about 50 to 1000 feet per minute.

As described above, some cooling of the film will take place as it passes through the fast roll section. In order to prepare the film for the transverse or lateral stretching operation, the longitudinally stretched film is generally preheated to temperatures of from about 250° to 300° F. This preheating may be accomplished by utilizing conventional methods such as by passing the film through an enclosed zone provided with either direct or indirect heating means. In the present process, however, it is preferred to pass the longitudinally oriented polypropylene film around rolls which are internally heated by circulating oil, steam or water, similar to the internally heated slow rolls previously described. The temperature of the rolls will be about 250° to 310° F. to heat the film to temperatures ranging from the about 220° to 300° F.

For some operations the longitudinally oriented film need not be preheated, and, consequently, the preheating section may be bypassed.

TRANSVERSE ORIENTATION

Although conventional apparatus designed to stretch continuous web or film material transversely or laterally may be employed in this step of the present process, a so-called textile-type tenter frame, is preferred. The tenter frame, for the purpose of this discussion, can be considered to be divided into four oven zones, which will be described in detail below. The entire length of the tenter frame is provided with parallel chains carrying a continuous succession of clamps or clips for gripping and moving the polypropylene web through the lateral stretching process. As the polypropylene film emerges from the preheat section of the longitudinal stretching section, it is directed between the parallel rows of tenter clips, and these tenter clips grip the edges of the longitudinally stretched film and move outwardly as the chains progress through the tenter frame to stretch the film transversely. At the end of the tenter frame, the clips are released and are returned by the chain to the front end of the tenter frame for engagement with the longitudinally oriented feed film.

In carrying out this operation it is essential to have tenter clips which seat firmly and positively over a wide range of gauges on the edges of the film. It has also been helpful to add a cooling tunnel over the return path of the tenter clips to prevent the clips from getting so hot that the film becomes soft under the shoe and slides out during the transverse stretching operation.

Returning now to the particular tenter frame being described. The tenter frame is partitioned into four individually heated and controlled zones which include a preheat zone, a first stretching zone, a second stretching zone, and an annealing zone. The first oven zone is a preheat zone in conjunction with preheating done on the entrance rolls, and normally no stretching is carried out here. The longitudinally oriented polypropylene film gripped by the tenter clips is heated to temperatures ranging from about 250° to 340° F. by circulating heated air as it is progressively moved through this zone.

In the second and third oven zones the gripped film is maintained at a temperature of about 225° to 300° F. and 200° to 275° F., respectively, by directing air, heated to the control temperature, at high velocity against both sides of the polypropylene web. The sides of the tenter frame diverge sharply to obtain a stretch ratio of about 6:1 to 12:1, and preferably about 8:1.

In the fourth oven zone is the annealing or heat setting zone in which the transversely stretched polypropylene is subjected to an elevated temperature within the range of about 300° to 350° F., preferably about 325° F., while the film is maintained under transverse and longitudinal tension. Little or no stretching takes place in this zone and a small amount of shrinkage up to about 5%, may be permitted.

Following the annealing treatment the film, while still under transverse and longitudinal tension is blown with air to cool the polypropylene film to near ambient temperatures, i.e., about 80° to 120° F.

At the end of the fourth zone is a release section where the clips are released. The film is continuously moved forward for further treatment and winding; while the tenter clips, as described are continuously returned to front end of the tenter frame. The release section is usually tapered slightly, for example, about 5%, to relax the transverse tension on the film before being released by the clips.

After leaving the tenter frame, the released polypropylene film is passed through an automatically traversing Beta-Ray gauge to check the uniformity of the thickness, and through a set of trim knives where the unstretched edges which have been held in the clips are removed and recycled to the extruder. Various conventional film spreading and smoothing devices, such as slat expanders, are used in handling the polypropylene film, and the film is wound on a conventional film winder. The trimming and wind-up sections are also provided with idler and nip rolls to maintain an even tension on the film during these operations.

Prior to wind-up the polypropylene film, which has now been oriented in both the longitudinal and transverse directions, may be treated by any of the well known methods to enhance the adhesive properties of either one or both sides of the oriented film. Such treatment can be accomplished, for example, by subjecting the polypropylene film to a Corona discharge from electrodes energized at about 10,000 volts and 2200 cycles per second. It will be understood that the use of Corona discharge is not mandatory to effect improvements in the adhesiveness of the film surface, since other known methods of treatment are equally applicable.

After being treated in this manner, which is similar to treatment of polyethylene film, the oriented polypropylene film product can be effectively printed or coated. It has been found that commercially available inks are readily applied to the polypropylene film and that a commercially acceptable degree of ink adhesion results.

The polypropylene film product which has been subjected to melt orientation in the machine direction, longitudinal orientation and transverse orientation in accordance with the process of this invention is designated as biaxially oriented film or bioriented film. The characteristics and properties of this biaxially oriented polypropylene film product are set forth in the following table.

*Table II*

Tensile strength (p.s.i.):
    Machine direction _____ 6,000 to 15,000
    Transverse direction _____ 25,000 to 50,000
Tensile modulus (p.s.i.):
    Machine direction _____ 120,000 to 250,000
    Transverse direction _____ 200,000 to 500,000
Elongation (percent):
    Machine direction _____ 200 to 600
    Transverse direction _____ 10 to 100
Initiated tear strength (gm./ml.):
    Machine direction _____ 2 to 15
    Transverse direction _____ 1 to 10
Haze (percent) _____ .2 to 5
Gloss (45-deg. head) _____ 70 to 95
Water vapor permeability (100° F., 90% R.H.)
    (gm./100 in. 2/24 hr./mil) _____ .1 to .2
Oxygen permeability (cc.-mil/100 in. 2/24 hr./atm.) _____ 100 to 200
Low-temperature toughness _____ Excellent
Coefficient of friction _____ .4 to .7
Tensile impact strength (ft. lb./in.$^3$):
    Machine direction _____ 200 to 2,000
    Tranverse direction _____ 800 to 1,500

The above data reveals that the biaxially oriented polypropylene film is characterized by having high clarity and gloss, low moisture permeability and moderate oxygen permeability, high strength as well as other properties which render the film attractive from a commercial standpoint. In addition, the bioriented film is not subject to aging when proetcted from ultraviolet light, or to the effects of changes in humidity or temperature; consequently, the film has an indefinite storage life.

For some purposes it is advantageous to obtain a bioriented polypropylene film which has been oriented to approximately the same degree in both longitudinal and transverse directions which results in a film product having balanced optical and mechanical properties. In attempting to manufacture the balanced biaxially oriented film, it was found that it was not feasible to effect all of the necessary longitudinal orientation prior to the transverse stretching step. Such a procedure led to serious operational problems resulting from splitting of the film during transverse stretching. In accordance with another feature of this invention it was found that a balanced film could be produced successfully by subjecting the polypropylene film, after it leaves the transverse stretching machine, to another longitudinal stretching which is carried out under operating conditions and with equipment, except for wider rolls, which are similar to those employed in the first longitudinal stretching section. Although the exact location of the second longitudinal stretching section subsequent to the transverse stretching section is not critical, the operation may be carried out prior to the trimming step.

When the second longitudinal stretching step is carried out the bioriented polypropylene film will be stretched in a ratio of about 6:1 to 12:1 in the transverse direction and a total of about 3.2:1 in the machine direction. In contrast to the prior art, it is not necessary to achieve approximately equal mechanical stretch ratios in the two directions in order to achieve balanced film properties. This is presumably due to contribution of the melt orientation imparted at the beginning of the present process. The second longitudinal stretching or orientation step may be carried out at a stretch ratio of about 1.3:1 to 3:1. The characteristics and properties of a typical balanced biaxially oriented polypropylene film product are set forth in the following table.

*Table III*

Gauge (mil) _____ .45 to .55
Tensile strength (p.s.i.):
    Machine direction _____ 26,000
    Transverse direction _____ 22,000
Tensile modulus (p.s.i.):
    Machine direction _____ 340,000
    Transverse direction _____ 330,000
Elongation (percent):
    Machine direction _____ 80
    Transverse direction _____ 65
Initiated tear strength (gm./ml.):
    Machine direction _____ 7
    Transverse direction _____ 7
Haze (percent) _____ 0.5–1.5
Gloss (45-deg. head) _____ >80
Water vapor permeability (100° F., 90% R.H.)
    (gm./100 in. 2/24 hr./ml.) _____ 0.35
Oxygen permeability (cc.-mil/100 in. 2/24 hr./atm.) _____ 150
Low temperature toughness _____ Excellent
Coefficient of friction _____ 0.8
Tensile impact strength (ft. lbs./in.$^3$):
    Machine direction _____ 330
    Transverse direction _____ 320

Although the balanced biaxially oriented polypropylene film has numerous commercial uses, it will be understood that for most purposes the bioriented film product obtained after being sequentially stretched in the longitudinal and transverse directions will be acceptable or even desirable. Furthermore, for some applications the annealing step, which has been described above, may be bypassed to achieve a film product having contraction or shrinking characteristics when subjected to heat. Such characteristics can be quite useful when the bioriented polypropylene film is employed to package articles and a tight fitting wrapper is desired.

The invention will be more fully understood by reference to the following illustrative examples.

EXAMPLE I

Profax polypropylene resin, having a melt index of 5.5 gm./10 sec. at 230° C. and an isotatic polypropylene content of 96% by weight, is extruded through a 3.5 inch Egan extruder equipped with a 12:5 inch flat film die, a water bath quench, and a water removal roll. The water bath contains a series of draw bars which guide and steady the web passing therethrough, and conventional means for continuously supplying cooled water to the bath at a rate of about 9 to 10 gallons per minute to maintain the water being withdrawn from the water bath at a temperature of about 40° F. The extruder die opening is about 50 mils, and the temperature at the die opening is about 450° F. The extruded web has a thickness of about 5 mils.

As the polypropylene web is extruded from the die it is immediately quenched in the water bath. The gap between the die and the surface of the cool water being set at about 1 inch. The extrusion and quenching operations are adjusted to obtain a draw down ratio of about 10:1 and maximum melt orientation in the polypropylene web. Rippling or any other disturbance of the water bath is prevented by use of stabilizing bars and baffles.

As the quenched polypropylene is continuously withdrawn from the water bath entrained water is removed therefrom by means of pinch rolls and air. The web is then passed around three slow rolls revolving at a rate of about 100 feet per minute. These rolls are maintained at a temperature of about 275° F. by internally circulating oil heated to 280° F. therethrough. Several nip and idler rolls are employed in conjunction with the slow rolls.

Following the series of slow rolls is a series of fast rolls revolving at a rate of about 135 feet per minute in order to overdrive the slow rolls and to obtain a machine directed stretch ratio of about 1.3:1. The fast rolls are allowed to run with no special cooling and reach a temperature of about 200° F.

The longitudinally oriented polypropylene web is next passed around a series of internally heated rolls, the heating method will be the same as that employed for the slow rolls, to preheat the web to a temperature of about 250° F. prior to passage to the transverse stretching section.

The transverse stretching section comprises a Marshall-Williams tenter frame largely enclosed in a gas-fired oven. This tenter frame and its method of operation have been described in detail above. The first portion of tenter frame is employed to supplement the preheating step by subjecting the traveling polypropylene web to convection heat to insure that the web is at a temperature of at least about 300° F. prior to being laterally stretched.

In the next two sections of the tenter frame the longitudinally oriented polypropylene web is stretched to obtain a transverse stretch ratio of about 8:1. During this operation hot air is constantly blown onto both sides of the film to maintain a temperature of about 275° F. The polypropylene web travels through the tenter frame at a rate of about 135 feet per minute.

Near the exit end of the tenter frame the polypropylene film, which has now been stretched in both the longitudinal and transverse directions, is heated at a temperature of about 325° F. for about 8 seconds while the film is being continuously moved forward. This step serves to anneal or stabilize the bioriented film. Following the annealing treatment, the polypropylene film is blown with cold air to cool it to about ambient temperature, and the cooled biaxially oriented film is released from the tenter clips.

When the film leaves the tenter frame it enters a trimming section comprising a pair of powered rotary, shear type trimmers which act to remove the edges of the film; a slat-expander for spreading and smoothing the film; and nip rolls which maintain an even tension on the film as it is trimmed. The trim is removed through pickup nozzles, led through a chopper and blown back to the resin in-feed station.

The trimmed, biaxially oriented polypropylene film is wound up by use of standard winder equipment. A summary of the important characteristics of the bioriented film product are set forth in the following table.

*Table IV*

| | |
|---|---|
| Stretch ratio: | |
|   Machine direction | 1.3:1 |
|   Transverse direction | 8:1 |
| Gauge (mil) | 0.5 |
| Tensile strength (p.s.i.): | |
|   Machine direction | 8,500 |
|   Transverse direction | 42,000 |
| Tensile modulus (p.s.i.): | |
|   Machine direction | 176,000 |
|   Transverse direction | 380,000 |

The film also had excellent haze and gloss characteristics, as well as low permeability to water vapor and oxygen.

EXAMPLE II

The trimmed film produced in Example I is run through additional stretching rolls. It is fed in at 50 feet per minute, preheated on a preheat roll to about 290° F., passed over a series of 4 single rolls with each succeeding roll being driven faster than the last, such that stretching takes place in three stretching gaps between the rolls. Total stretch is 140% equally divided among the three stretch zones, or a stretch ratio of 2.4:1.

A number of the important characteristics of the biaxially oriented film product are set forth in the following table.

*Table V*

| | |
|---|---|
| Stretch ratio: | |
|   Machine direction (cumulative) | 3.12:1 |
|   Transverse direction | 8:1 |
| Gauge (mil) | 0.4 |
| Tensile strength (p.s.i.): | |
|   Machine direction | 22,000 |
|   Transverse direction | 19,000 |
| Tensile modulus (p.s.i.): | |
|   Machine direction | 200,000 |
|   Transverse direction | 220,000 |

This film also had excellent haze and gloss characteristics as well as low permeability to water vapor.

The foregoing embodiments show that the process of this invention may be effectively employed to produce biaxially oriented polypropylene film having outstanding mechanical and optical properties. The film product has numerous important commercial applications, and the process has sufficient flexibility to tailor-make bioriented films having modified properties required for certain specific uses.

The particular sequential process steps as outlined and described above are considered to be important features of this invention. Although commercially available equipment may be employed in most of these steps, the particular operating conditions used and the results achieved thereby are also considered to be essential features. One very important part of this invention is the obtainment of maximum melt orientation in the polypropylene web during the extrusion and quenching operations. This type of orientation plus the longitudinal orientation achieved prior to transerse stretching is vitally important in order to provide the necessary impact resistance in the longitudinal direction of the film product and to permit commercial process ability. Because of the melt orientation which is achieved while carrying out the process of this invention it has been found that the polypropylene film does not have to be stretched the same amounts in both the machine and transverse directions in order to attain a polypropylene film product having balanced properties. Other important operations and conditions include the maintenance of substantially ripple-free or calm water in the water bath employed in the quenching step.

While particular embodiments of this invention are shown above, it will be understood that the invention is obviously subject to variations and modifications without departing from its broader aspects.

What is claimed is:

1. A process for the production of biaxially oriented film which comprises the following continuous, sequential steps:
    (a) extruding polypropylene resin, having an isotatic polypropylene content of greater than about 70% by weight, at a temperature of about 350° to 550° F. from an extrusion zone in a web thickness of about 8 to 12 times finished web thickness and at a draw down ratio above about 7:1 to obtain maximum melt orientation;
    (b) rapidly cooling said extruded web in a zone containing substantially a ripple-free liquid quench whose upper surface is maintained at a distance of about ⅜ to 2 inches from the exit point of the web from said said extrusion zone;
    (c) withdrawing said extruded web from the liquid quench and stretching the web in a longitudinal direction at a temperature of about 200° to 300° F. to a stretch ratio of about 1.2:1 to 1.6:1;
    (d) heating the longitudinally stretched web, while said web is under longitudinal tension, to a temperature of about 250° to 300° F.;
    (e) stretching the heated longitudinally stretched web in a transverse direction at a temperature of about 200° to 300° F., while said web is under longitudinal tension, to obtain a stretch ratio of about 6:1 to 12:1;
    (f) cooling the resulting biaxially oriented polypropylene film to about ambient temperature; and
    (g) recovering the biaxially oriented polypropylene film.

2. A process for the production of biaxially oriented film from polypropylene resin which comprises the following continuous, sequential steps:
    (a) feeding polypropylene resin, having an isotatic polypropylene content of greater than about 70% by weight and an intrinsic viscosity of about 1.0 to 4.0, to an extruder;
    (b) extruding said polypropylene resin at an elevated temperature from the die of said extruder at a draw down ratio of about 10 to 1 to form a polypropylene web having a thickness of about 40 to 60 mils;
    (c) rapidly cooling said extruded polypropylene web in a cooling medium said cooling medium being maintained substantially ripple-free and the surface of the cooling medium being at a distance of about ⅜ to 2 inches from the extruder die;
    (d) withdrawing said polypropylene web from the cooling medium and drying said web;
    (e) stretching said dried polypropylene web in a longitudinal direction at a temperature within the range of about 200° to 300° F. to achieve a stretch ratio of from about 1.2:1 to 1.6:1;
    (f) heating the longitudinally stretched polypropylene web, while said web is under longitudinal tension, to a temperature of about 250° to 300° F.;
    (g) stretching the heated longitudinally stretched polypropylene web in a transverse direction at a temperature of about 200° to 300° F., while said polypropylene web is under longitudinal tension, to obtain a stretch ratio of about 6:1 to 12:1;
    (h) heating the resulting biaxially oriented polypropylene film for a sufficient period of time to effect annealing, while said polypropylene film is maintained under longitudinal and transverse tension;
    (i) cooling said biaxially oriented polypropylene film to about ambient temperature and then releasing said transverse tension; and
    (j) recovering the biaxially oriented polypropylene film.

3. The process of claim 2 wherein said polypropylene resin has an isotatic polypropylene content of about 85 to 98% by weight.

4. The process of claim 2 wherein said elevated extrusion temperature ranges from about 350° to 500° F.

5. The process of claim 2 wherein said cooling medium is water.

6. The process of claim 2 wherein said biaxially oriented polypropylene film is heated to a temperature of about 300° F. to 350° F. for about 3 to 10 seconds to effect annealing.

7. The process of claim 2 wherein said cooled biaxially oriented polypropylene film is trimmed to remove film edges which have not been transversely stretched.

8. The process of claim 7 wherein said trimmed edges are recycled to said extruder and wherein said polypropylene resin contains up to 80% by weight of the recycled polypropylene.

9. The process of claim 2 wherein said cooled biaxially oriented polypropylene film is further stretched in a longitudinal direction at a temperature of about 200° to 300° F. and a stretch ratio of about 1.3:1 to 3:1 to obtain biaxially oriented polypropylene film.

10. A process for the production of biaxially oriented film from polypropylene resin, having an isotatic polypropylene content of about 85 to 98% by weight and an intrinsic viscosity of about 1.0 to 4.0 which comprises the following continuous, sequential steps:
    (a) extruding said polypropylene resin at a temperature of about 350° to 500° F. into water said water being substantially ripple-free and the surface of said water being at a distance of about ⅜ to 2 inches from the point at which molten polypropylene resin exists from the extrusion zone, at a draw down ratio above about 7 to 1 to obtain a continuous polypropylene web about 40 to 60 mils thick and having a maximum degree of melt orientation;
    (b) withdrawing said polypropylene web from the water and removing entrained water therefrom;
    (c) stretching said dried polypropylene web in a longitudinal direction at a temperature of about 200° to 300° F. to achieve a stretch ratio of from about 1.2:1 to 1.6:1.
    (d) heating the longitudinally stretched polypropylene web to a temperature of about 220° to 300° F.;
    (e) stretching the heated, longitudinally stretched polypropylene web in a transverse direction at a temperature of about 200° to 300° F., while said polypropylene web is maintained under longitudinal tension, to obtain a stretch ratio of about 6:1 to 12:1;
    (f) heating the resulting biaxially oriented polypropylene film to a temperature of about 300° to 350° F. for about 3 to 10 seconds to effect annealing, while said polypropylene film is maintained under longitudinal and transverse tension;
    (g) cooling said biaxially oriented film to about ambient temperature and releasing said transverse tension;
    (h) trimming off the parallel edge portions of said film; and (i) recovering the biaxially oriented polypropylene film.

References Cited by the Examiner

UNITED STATES PATENTS

| | | |
|---|---|---|
| 2,862,350 | 12/1958 | King et al. |
| 3,022,543 | 2/1962 | Baird et al. _____ 264—209 |

FOREIGN PATENTS

| | | |
|---|---|---|
| 223,196 | 7/1959 | Australia. |
| 627,801 | 9/1961 | Canada. |
| 851,727 | 10/1960 | Great Britain. |

OTHER REFERENCES

Overgage, E. and G. John: The Manufacture of Clear Film From High Density Polythene by Water Bath Quenching. In British Plastics, 32(11): p. 512–515, November 1959.

"581,390: Films From Synthetic High Polymers," In Derwent Belgian Patents Report No. 62B at page C7, May 4, 1960. For. Pat. JR1.

ALEXANDER H. BRODMERKEL, *Primary Examiner.*

MICHAEL V. BRINDISI, *Examiner.*